No. 845,139. PATENTED FEB. 26, 1907.
N. STRUCK.
MACHINE FOR AUTOMATICALLY GRINDING SPIRAL OR TWIST DRILLS.
APPLICATION FILED DEC. 30, 1905.
8 SHEETS—SHEET 1.

Fig. 1.

WITNESSES
Alvin G. White
W. P. Burke

INVENTOR
Nicolai Struck
BY Richards
ATTYS

No. 845,139. PATENTED FEB. 26, 1907.
N. STRUCK.
MACHINE FOR AUTOMATICALLY GRINDING SPIRAL OR TWIST DRILLS.
APPLICATION FILED DEC. 30, 1905.

WITNESSES
Alvin J. White
W. P. Burke

INVENTOR
Nicolai Struck

No. 845,139. PATENTED FEB. 26, 1907.
N. STRUCK.
MACHINE FOR AUTOMATICALLY GRINDING SPIRAL OR TWIST DRILLS.
APPLICATION FILED DEC. 30, 1905.

WITNESSES
W. P. Burke
L. Hajek

INVENTOR
Nicolas Struck
By Richardson
ATTYS.

No. 845,139. PATENTED FEB. 26, 1907.
N. STRUCK.
MACHINE FOR AUTOMATICALLY GRINDING SPIRAL OR TWIST DRILLS.
APPLICATION FILED DEC. 30, 1905.

No. 845,139. PATENTED FEB. 26, 1907.
N. STRUCK.
MACHINE FOR AUTOMATICALLY GRINDING SPIRAL OR TWIST DRILLS
APPLICATION FILED DEC. 30, 1905.

WITNESSES
INVENTOR
Nicolai Struck
BY
ATTYS

UNITED STATES PATENT OFFICE.

NICOLAI STRUCK, OF ST. PETERSBURG, RUSSIA.

MACHINE FOR AUTOMATICALLY GRINDING SPIRAL OR TWIST DRILLS.

No. 845,139.  Specification of Letters Patent.  Patented Feb. 26, 1907.

Application filed December 30, 1905. Serial No. 294,352.

*To all whom it may concern:*

Be it known that I, NICOLAI STRUCK, a citizen of Russia, residing at 23 Golovinski Perenlok, St. Petersburg, Russia, have invented new and useful Improvements in Machines for Automatically Grinding Spiral or Twist Drills, of which the following is a specification.

This invention relates to an apparatus for grinding helical or twist drills, the object being to enable the drills to be ground automatically without necessitating the supervision of an attendant and also to provide for adjustability within wide limits, so that drills of varying shapes and diameters can be ground for further use.

One form of machine according to the invention is illustrated in the accompanying drawings, Figure 1 being a side elevation, Fig. 2 a plan, and Fig. 3 an end elevation.

Figure 16:
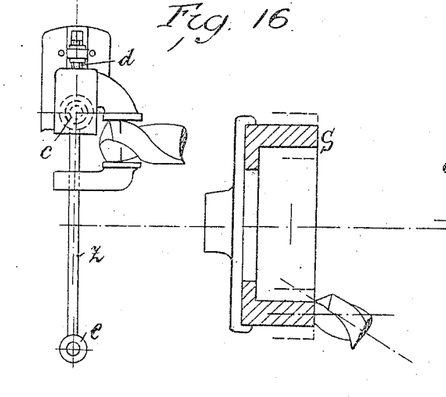
Figs. 16 and 17 illustrate the adjustment of the grindstone for various thicknesses of drill.
Figure 17:
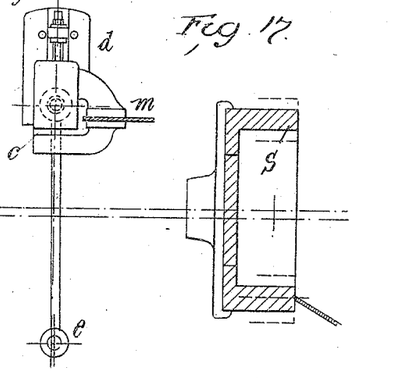

In the example illustrated the head-stock B of the grindstone is traversable in guides on the bed A, the latter being formed as a water-tank. The head-stock B supports the mandrel of the grindstone, the mandrel being fitted with a driving-pulley C. The grindstone is in the form of a cylindrical ring mounted on a disk or carrier F, the two being inclosed within a guard W, which catches the water thrown off by the stone and conducts it back to the tank. A reciprocating motion is continually imparted to the head-stock B by a rod Z, connected to a bolt $c$ on the head-stock and driven off an eccentric $e$, mounted on or connected with a worm-wheel driven by a worm-shaft $s$, provided with a pulley $r'$. The working surface of the grindstone thereby receives a combined circular and reciprocatory movement, and the wearing effect of the tool is thus distributed over the whole area of the annular surface of the stone. In order to render this wear uniform for drills of various diameters, the position of the bolt $c$ on the head-stock can be shifted relatively to the connecting-rod by a screw $d$, and a gage $m$ may be used, between the jaws of which the drill to be operated on is fitted before the machine is started in such a manner that the adjusting-screw is rotated, so that the jaws of the gage just touch the drill, as shown in Figs. 16 and 17. By this means it is always possible to so adjust the center of the working surface of the grinding-disk that it coincides with the center of the drill-faces in the same vertical plane. A pump $p$ for supplying water to the grinding-disk is also operated from the shaft of the pulley $r'$. The bracket T is fitted to the supporting-lugs $U''$ of the bed, so that the drill-table can be swung round as desired.

To the pivot $U'$, on which the drill-table swings, two pulleys $jj$ are fitted, over which a belt is conducted and is carried to the pulley $g$ of the drill-carriage. This pulley $g$, through the intermediary of a clutch or coupling $h$, operates a hollow shaft, which by means of a worm $o^x$ and worm-wheels $q\ q'$ occasions the continual rotation of the drill around its axis while being ground and the swinging motion of the drill-supporting carriage and its parts toward the bracket T, so as to produce around the axis of rotation $a$, situated near the grinding-disk, a rotative movement as well as a reciprocatory movement of this part toward and away from the grinding-disk. The latter movement is effected by the worm-wheel $q'$, fitted to the vertical shaft $q''$, which primarily effects the swinging motion of the table by means of an intermediate gear, and, secondly, a drawing back of the drill by means of a cam-gear with a view to reversing to the other edge of the drill. The cam-shaped disk $i$ of the shaft $q''$ works with the roller $u$ on the arm $v$, united to the swinging plate M, the shaft $q''$ being carried on the drill-holder table $w$. A movement in the longitudinal axis of the drill is imparted to this table by the cam-gear, so that a spring $x$ is alternately stretched and released, which occurs at each half-revolution of the sleeve H, which receive the drill. The pivot $z'$ of the crank-disk $t$ of the shaft $q''$ engages in a slot of the arm $y$ on the carrier T, by which the plate M on the carrier T swings around the bolt $a$ and guided by the segment $s'$ on the machine-frame. The slide can, if desired, be made fast to the support T by means of the segmental guide $s'$. In this manner as the drill turns once on its axis it receives two swinging motions around the pivot $c^3$. In order that the cutting edge shall not touch against the grindstone on the return, a cam-gear $i\ u\ v$ is provided, which draws the drill back at the right moment in an opposite direction to the action of the spring $x$. A controlling-gear is connected to this and pushes the drill forward for grinding. A pawl $K$ is fitted to the plate M and engages with a ratchet-wheel $K$ on the table $w$. This ratchet-wheel by means of pins operates the lever of a pawl $K'$ of a second ratchet-wheel $R'$, the shaft of which carries an eccentric $E$ and is fitted to the plate M. The spring $x$ forces the table $w$ against the eccentric, by the rotation of which the forward motion is obtained. After a certain number of reciprocating movements the eccentric automatically effects a withdrawal of the drill, so that the latter is not overground. The clutch-coupling $h$ of the hollow shaft of the pulley $g$ operates in conjunction with the projection $i'$ on the bracket $k'$, so as to free the coupling by the projection $i'$ to hold the drill-carrier exactly in the position which is most suitable for the fitting in of the next drill to be ground. The drill is passed into the sleeve H and can be pushed out of the centering-chuck $v'$ by means of a central screw-rod $v^2$.

Figure 1:
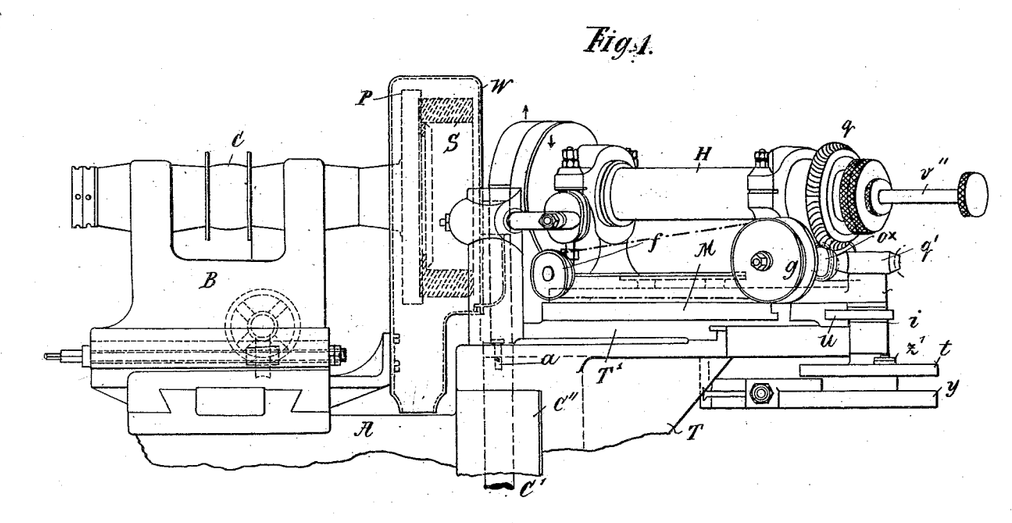
Figure 2:
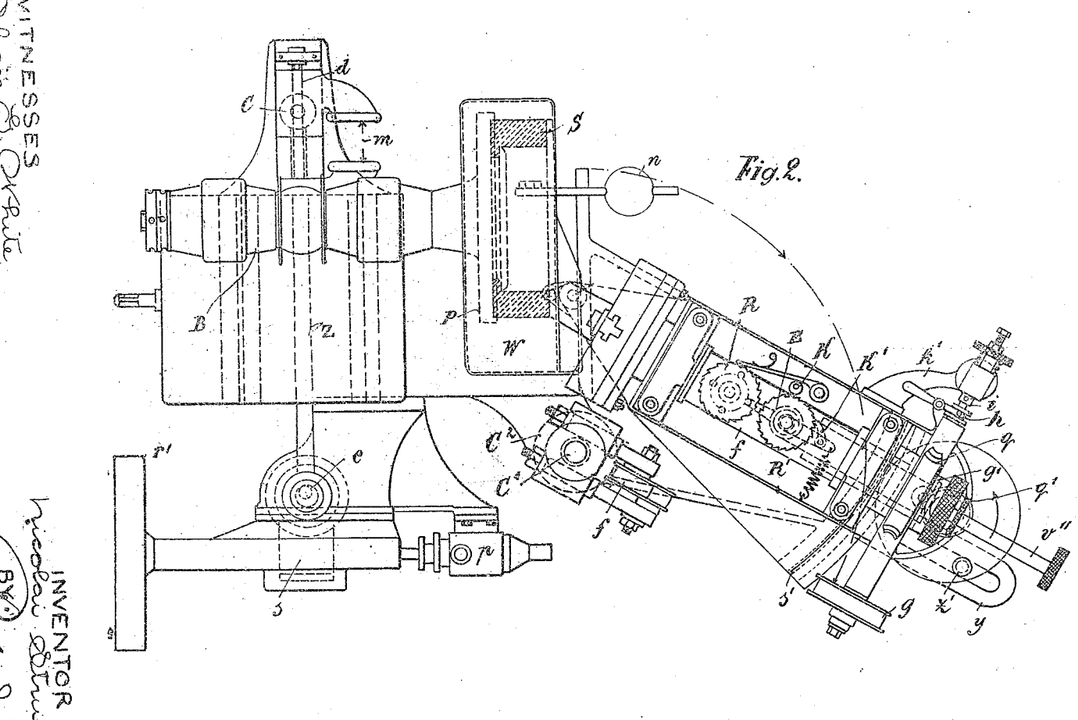
Figure 3:
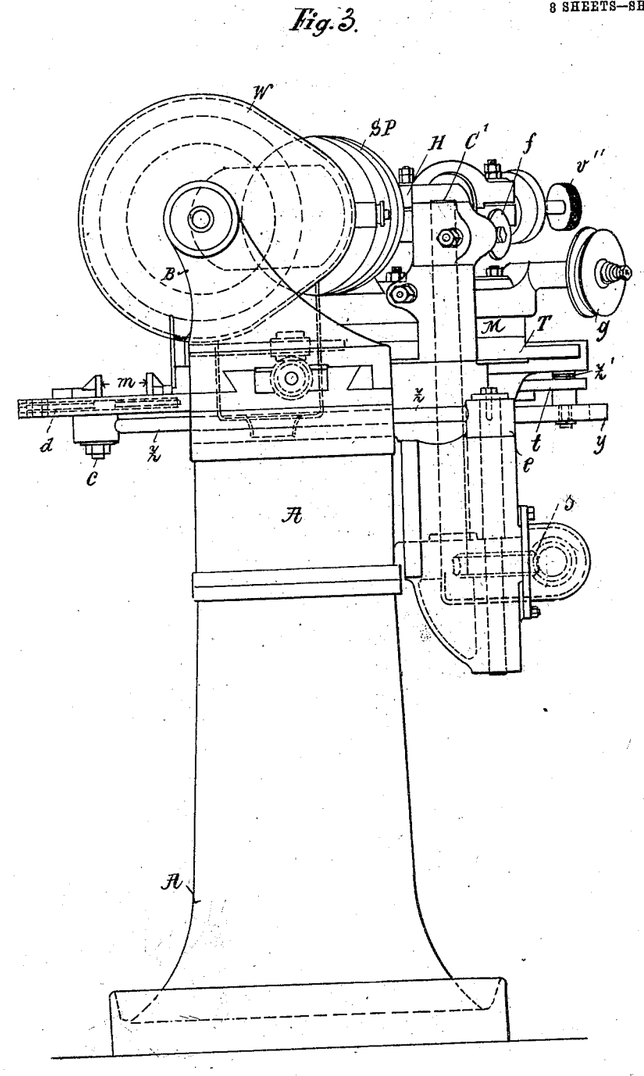
Figure 4:
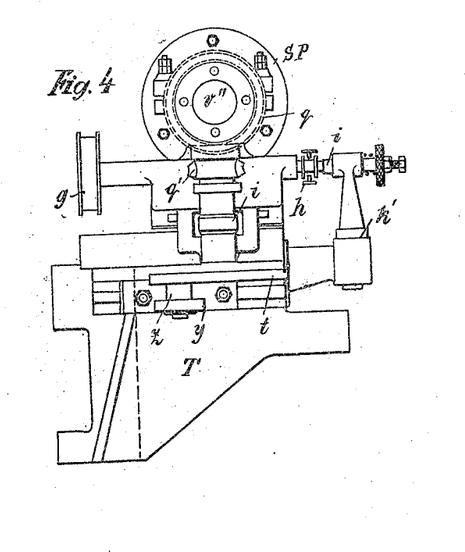
Figs. 4 to 7 are respectively end elevation, side sectional elevation, end sectional elevation, and plan of the drill-carrier.
Figure 5:
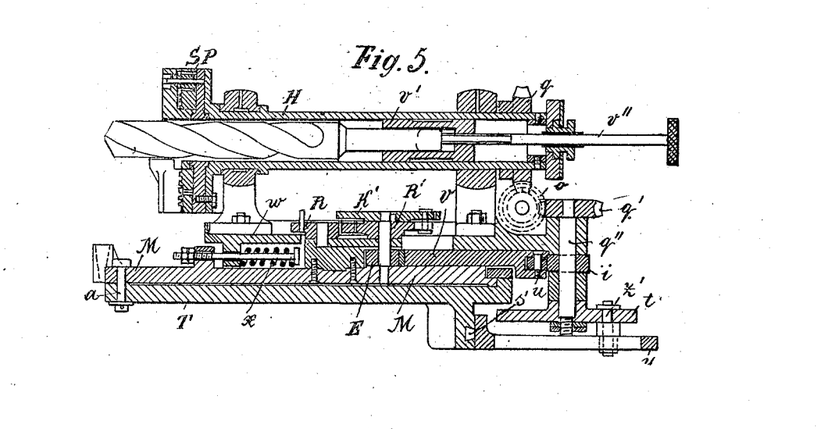
Figure 6:
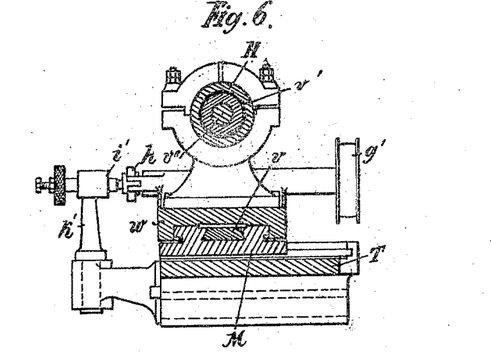
Figure 7:
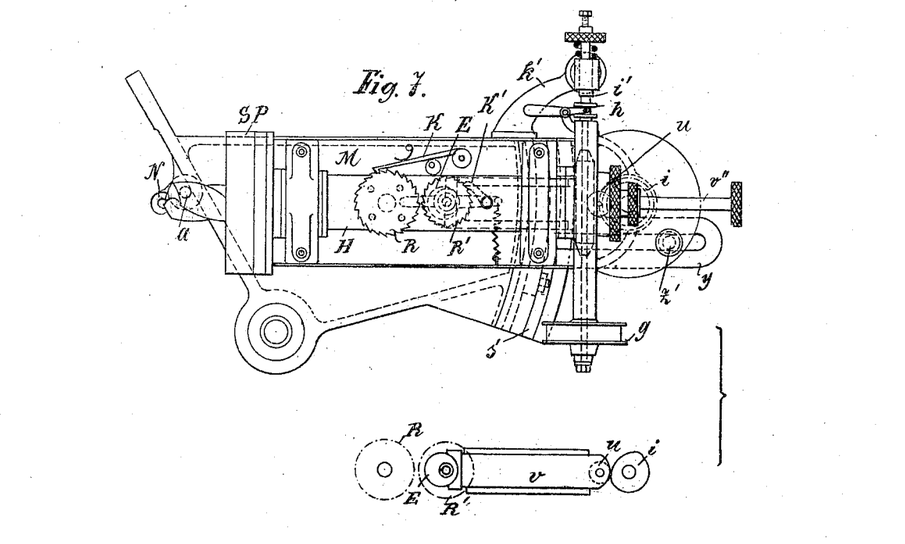
Figures 8, 9, 10, 11, 12:
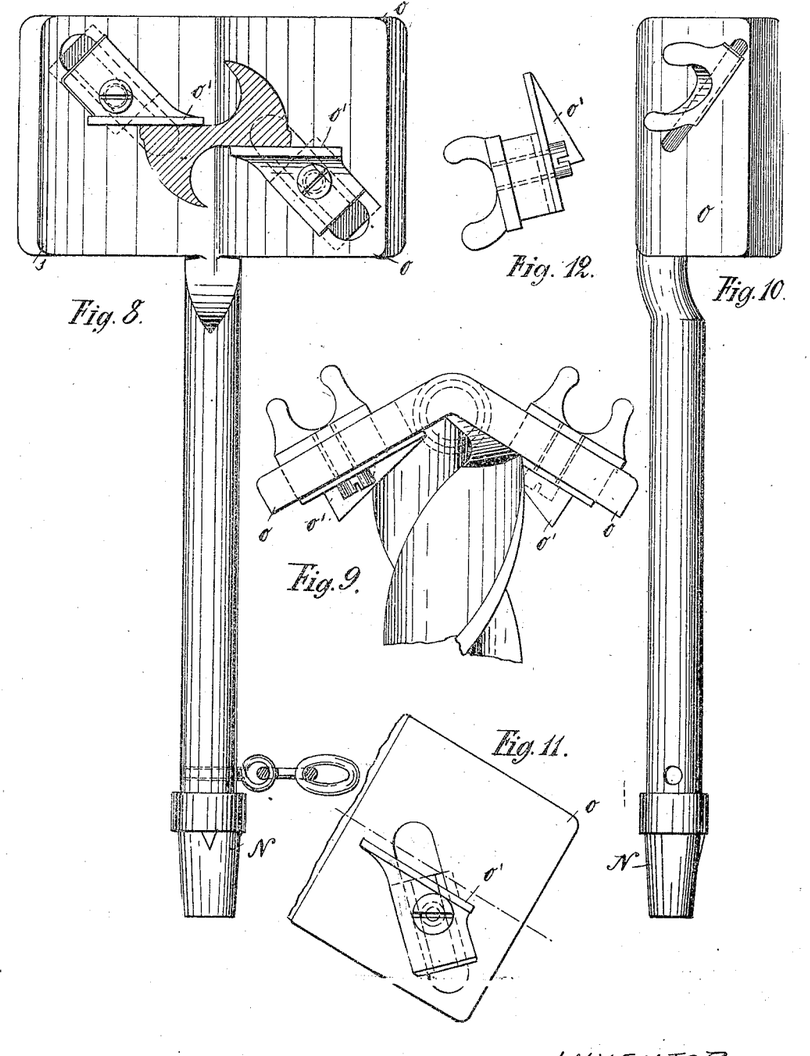
Figs. 8 to 12 are various views of details of the drill-carrier.
Figures 13, 14:
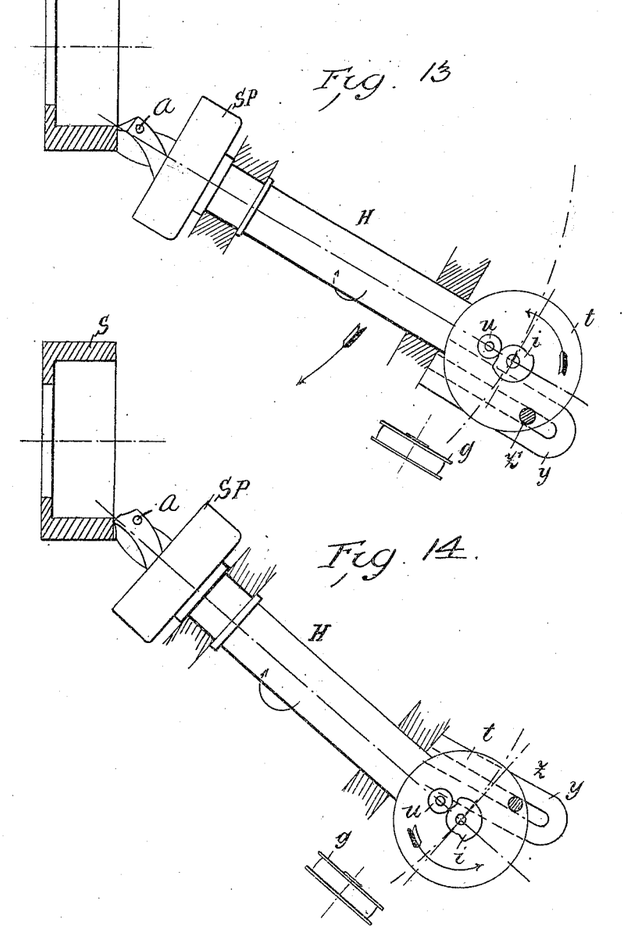
Figs. 13, 14, and 15 illustrate the drill in three positions at different periods of its motion.
Figure 15:
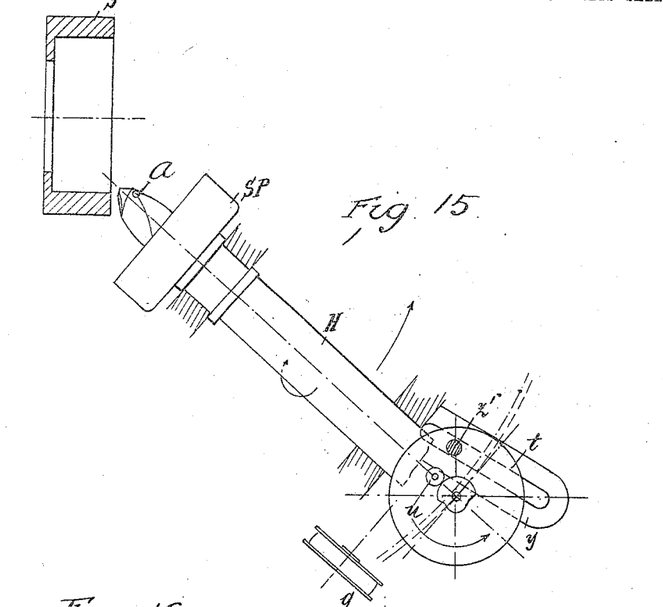

For placing the point of the drill in position on the grinding-body a special device (see Figs. 8 to 12) is employed, which is mounted in a conical sleeve N on the front end of the plate M. In these figures, Fig. 8 is a plan view of the device, and Fig. 9 an enlarged view of one end of the same. Fig. 10 is a side elevation, and Fig. 11 an inside elevation of one-half of the device, and Fig. 12 a view of one of the beveling-holders detached.

To place, as far as possible, the drill in exactly the proper position and to allow of varying thicknesses of the cutting edges on one hand and their theoretical point on the other, the main plate $o$ of the bevel arranged on its supporting-spindle has two half-plates sloping toward each other, the opposite inclination of which correspond to that of the point of the drill, as may be seen from Fig. 9. On each of the half-plates a shoe $o'$ is adjustable in such a way that the front surfaces of the horizontal middle line of the plate $o$, serving as a receiver for the drill, can be adjusted to it in a parallel direction. In this way a secure adjustment within wide limits is obtained for drills of varying size, as can be seen from the above figures. By means of the device the theoretical point of the drill in one vertical axis can be brought into the same plane as the cutting edges of the drill in spite of their having varying thicknesses. For conveniently manipulating the drill-holding shoes on the bevel-plate they are preferably provided with a screw or other arrangement for attachment thereto.

The shoes receiving the drill are mounted on the main bevel-plate $o$, being adjustable in inclined slots. The drill lies with its principal edges on these shoes, while its middle edges engages in a groove cut crosswise to the surface in the angle between the two main bevel-plates.

Having now particularly described my invention, what I claim as new, and desire to secure by Letters Patent, is—

1. A machine for grinding drills comprising a rotary grinder, means for imparting a transverse reciprocating movement thereto during its rotation, a drill supported with its cutting edge in proximity to said grinder, means for rotating the drill and means for swinging it during each rotation thereof.

2. A machine for grinding drills comprising a rotary grinder, means for imparting a transverse reciprocating movement thereto during its rotation, a drill supported with its cutting edge in proximity to said grinder, means for rotating the drill, and means for swinging it during each rotation thereof, and means for automatically moving the drill toward and from the grinder.

3. In a device of the character described, the combination with a suitable support and a rotary grinder, of a drill-supporting table, a drill-carrier longitudinally movable thereon, means for reciprocating said carrier, and pawl-and-ratchet-controlled means for regulating the amount of said reciprocation said pawl-and-ratchet means being rendered effective by the reciprocation of the drill-carrier.

4. In a device of the character described, the combination with a suitable support and grinder, of a drill-supporting table, a drill-carrier longitudinally movable thereon, a drill carried thereby with means for rotating it, a spring tending to draw said carrier toward the grinder, a cam device for moving said carrier against the action of the spring, a cam for limiting the movement of the carrier toward the grinder, a ratchet-wheel on the carrier operatively connected with said cam, and a pawl carried by the table and engaging the ratchet-wheel.

5. In a device of the character described, a suitable support, a grinder rotatably mounted thereon, a drill-supporting table pivoted to said support to swing on a vertical axis, a drill mounted on said support to have a rotary and reciprocating movement, operating means for imparting such movement to the drill, and a device for swinging said supporting-table, said device being operated from the operating means for the drill.

6. In a device of the class described, a suitable support, a grinder carried thereby, a drill-supporting table pivoted to said support, a drill rotatably carried by said support, gearing for rotating said drill, and an eccentric-pin engaging a guide on the support and operated from the said gearing for swinging the table.

7. In a device of the class described, the combination with a means for supporting the drill and rotating it during the grinding action, of a rotary grinder, means for moving the same transversely of its axis of rotation, means for adjusting the grinder with relation to such moving means, and a drill-gage for securing adjustment in accordance with the drill to be ground.

In testimony whereof I have signed my name to this specification in the presence of two subscribing witnesses.

NICOLAI STRUCK.

Witnesses:
H. A. LOVIAGUINE,
TH. TRYMAK.